United States Patent [19]

Schmidt

[11] Patent Number: 4,474,825

[45] Date of Patent: Oct. 2, 1984

[54] MONITORING TEMPERATURE OF WIRE DURING HEATING

[75] Inventor: Peter J. Schmidt, Gananoque, Canada

[73] Assignee: Northern Telecom Limited, Montreal, Canada

[21] Appl. No.: 356,140

[22] Filed: Mar. 8, 1982

[51] Int. Cl.$^3$ .............................................. B05D 3/14
[52] U.S. Cl. ..................................... 427/10; 427/120;
427/318; 118/620; 118/666; 118/712; 219/50;
219/497; 219/155; 425/143; 425/113; 264/174;
264/40.1; 432/8; 432/36; 432/59
[58] Field of Search ................. 219/50, 497, 155, 156;
427/10, 120, 318; 118/666, 712, 620; 425/143,
113; 264/174, 40.1; 432/8, 59, 36

[56] References Cited
U.S. PATENT DOCUMENTS 3,448,242 6/1969 Waldman et al. ...................... 219/50
3,752,956 8/1973 Cahill et al. .......................... 219/497
3,842,239 10/1974 Ellinghausen et al. ............. 219/155

Primary Examiner—Norman Morgenstern
Assistant Examiner—Richard Bueker
Attorney, Agent, or Firm—R. J. Austin

[57] ABSTRACT

Temperature monitoring of electrically conductive wire during heating in which the current in the wire in the heating zone is measured and the voltage at the downstream end portion of the zone is measured, signals corresponding to the measured values then being combined to produce a resultant signal corresponding to the resistance of the wire at the downstream end portion of the heating zone. The resistance value corresponds to the temperature of the heated wire. Apparatus includes current and voltage measuring means located in the appropriate positions to enable temperature monitoring, and means to combine voltage signals which correspond to the measured values and to produce a combined signal representative of wire resistance after heating.

6 Claims, 1 Drawing Figure

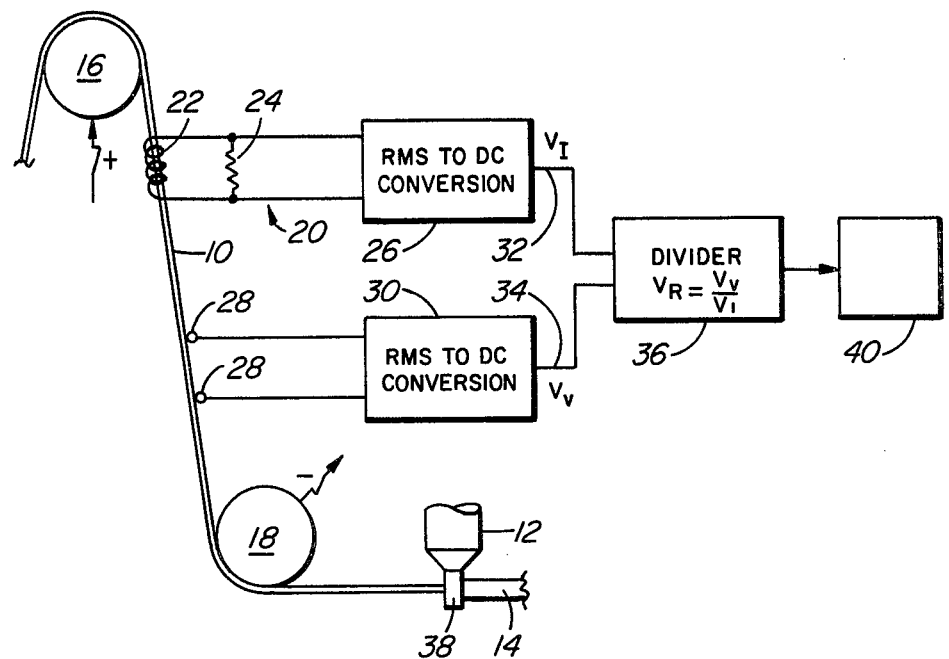

MONITORING TEMPERATURE OF WIRE DURING HEATING

This invention relates to monitoring of the temperature of wire during heating.

In the manufacture of electrical conductors for electrical or telecommunications purposes, it is known that during the drawing of the conductor wire, the wire is subjected to work hardening. An annealing process is therefore necessary to enable the wire to achieve the physical properties which it is required to have in the final product. After the annealing process it is necessary for the wire to be insulated by the extrusion of a polymeric material over the wire. It has been known for many years that to enable the polymeric material to be extruded onto the wire in the most desirable manner, then it is necessary for the wire to be preheated immediately before it passes through the extrusion machine. If the wire is too cold as it passes through the extruder, then the polymeric material, after extrusion onto it, cools faster than is desirable and the strength of the adherence between plastic and the wire is not satisfactory. Alternatively, if the temperature of the wire is too high as it passes through the extruder, then the polymeric material cools too slowly and tends to flow around the wire before hardening thereby causing eccentricity of the wire within the insulation. It has been determined that the wire temperature as it passes into the extruder should be substantially equal to the temperature of the extrudate to prevent either of the two disadvantageous situations.

While it may not appear to be very important to ensure that the plastic to wire adherence is acceptable and also to ensure that there is no wire eccentricity within the insulation, either circumstances may lead to the electrical characteristics being undesirably affected. In fact, it has always proved to be impossible to control the temperature of the wire, absolutely, as it enters the extruder and the temperature variation which is at present obtained leads to a capacitance to ground unbalance which is most undesirable when the finished product is to be used in the telecommunications field.

When foam insulation is applied to a wire, if the temperature of the wire is not controlled immediately before application of the foamed polymeric insulation, then other results, also undesirable, may be obtained. For instance, if the wire is at a temperature greater than that required, then the foam, as it is applied, will blow to a greater degree than is necessary to obtain the desired electrical characteristics. Alternatively, if the conductor temperature is too low, then the bubble structure of the foam will not be evenly dispersed, and this again will affect the electrical characteristics.

While the control of the temperature of the ingoing wire into the extruder may seem a relatively simple matter, such has not proven to be the case. For instance, a wire temperature monitoring device is available in the form of a split thermocouple having an iron wheel and a wheel formed from constantin, the wheels being axially aligned and slightly spaced apart. The peripheries of the wheels form a Vee groove within which the conductor wire moves as it is fed towards the extruder. The device operates by measuring the electromotive force as the wire moves between the wheels and, as the electromotive force varies as the temperature varies, then theoretically the temperature may be decided. There is a practical problem, however, existing with this type of device in that copper dust from the copper conductor wire becomes attracted into the space between the wheels and seriously affects the electromotive force measured by the device. The device is therefore unacceptable for measurement of temperature for conductor wires before they are fed into an extruder.

Another suggested device is one in which the conductor wire is fed through a chamber and the wire temperature is compared with the temperature of a sensing head. The difference between the temperatures is measured by a sensor and the wire temperature is then calculated from this difference. This device also has the problem, however, that its readings are affected by the amount of copper dust within the device and it is known from practical experience, that copper dust does in fact accummulate inside the device and influences the readings taken of the temperature.

Hence, although the solution to the problem appears to be a simple matter, no device and no method has been discovered up to the present time which will achieve the object of monitoring the temperature correctly.

The invention provides a method of monitoring the temperature of an electrically conductive wire during heating of the wire comprising:
  feeding the wire through a heating zone and heating it in said zone by passing an electrical current through the wire in said zone;
  measuring the current in the wire in said zone;
  measuring the voltage in the wire at a downstream end portion of the zone; and
  combining signals corresponding to the measured voltage and current to produce a resultant signal corresponding to the value of the resistance of the wire at said downstream end portion, the value of the resistance relating to the temperature of the wire.

The method is particularly applicable to the monitoring of temperature when the method is included as part of an insulating process for conductor wire. Accordingly, the invention also comprises a method of providing an insulated conductor wire comprising:
  feeding a conductor wire through a heating zone;
  heating the conductor wire in said zone by passing an electric current through the wire in said zone;
  measuring the current in the wire in said zone;
  measuring the voltage in the wire at a downstream end portion of the zone;
  combining values corresponding to the measured voltage and current to determine the resistance of the wire at said downstream end portion, the value of the resistance related to the temperature of the wire and thus enabling the current passing through the wire to be controlled to control the wire temperature at said downstream end portion of the zone within preset limits; and
  passing the heated wire through an extruder to extrude a polymeric insulation around the wire.

It is found that with the use of the above process, the temperature of the wire may be determined substantially accurately when the relationship between change in resistance and change in temperature is known. The resistance of the wire does, in fact, vary linearly with the change in temperature. Hence, a current passing along the wire through the heating zone may be measured anywhere within that zone because the current along the zone at any time is constant. The voltage is measured in the downstream end portion of the zone because the voltage also varies with the temperature of the wire and its reading must therfore be taken at the position, or adjacent the position, at which the wire emerges from the heating zone. With a knowledge of the current and voltage values in the heated wire at the downstream end portion of the heating zone, it is then possible to determine the resistance of the heated wire at this downstream end portion by the use of Ohm's Law.

The invention also includes an apparatus for monitoring the temperature of electrically conductive wire during heating of the wire comprising:

means to pass a heating current in the wire at a heating zone as the wire is passed among a feedpath and through the zone;

current measuring means disposed to measure the current in the wire in said zone;

a voltage measuring means disposed to contact the wire as it passes through a downstream end portion of the zone to measure the voltage in the wire at said downstream end portion;

means to produce combinable voltage signals which correspond to the measured current and voltage; and combining means for said voltage signals to produce a combined signal representative of the resistance in the wire at said downstream end of the wire.

The invention further includes an apparatus for providing an insulated conductor wire comprising:

temperature monitoring apparatus according to the last preceding paragraph and, immediately downstream of the voltage measuring means, an extruder for extruding the insulation around the wire as the wire is fed through an extrusion head.

One embodiment of the invention will now be described, by way of example, with reference to the accompanying drawing which is a diagrammatic representation of a part of a continuous line for conductor wire as it passes through apparatus for providing it with a polymeric insulation.

As shown in the drawing, in apparatus for insulating a conductor wire 10, the wire is passed along a feedpath in which, shortly before reaching an extruder 12 for polymeric insulation 14, it is passed around two rolls 16 and 18 which are spaced apart along the feedpath. These rolls 16 and 18 are located at upstream and downstream ends of a heating zone for the conductor wire. Both the rolls 16 and 18 are connected into an electrical circuit and the circuit is completed when the conductor wire extends between the rolls during its movement along the feedpath so that current for heating the wire passes along it between the rolls 16 and 18.

For the purpose of determining the temperature of the wire towards the end of its heating step, means is provided for measuring the current in the wire and also the voltage in the wire. The current measuring means 20 comprises a current transformer 22 which is positioned to surround the feedpath for the wire and a current to voltage resistor 24 bridging the coil to convert the measured current in the coil to a corresponding AC voltage. This voltage is fed to an RMS to DC converter 26 for converting the voltage to a corresponding DC voltage signal.

The means for measuring the voltage in the heated wire comprises two electrically conductive probes 28 disposed in spaced-apart positions along the feedpath for the wire immediately adjacent the roll 18, i.e. at the downstream end portion of the heating zone. The probes 28 are located between 2 and 3" apart along the feedpath to measure the voltage along that length of wire. These probes are connected in a circuit, which also comprises the copper wire when this is passed through the apparatus, and also includes a RMS:DC converter 30 for converting an AC voltage signal from the probes 28 into a corresponding DC voltage signal. Both of the converters 26 and 30 may be of any suitable type. The converters which are actually used in the embodiment are Model Nos. 4341 produced by Burr-Brown of Tucson, Ariz., U.S.A.

The DC voltage signals proceed from the converters along lines 32 and 34 to a divider 36 which divides the signal from converter 30 by that from converter 26 to arrive at a resultant voltage signal at the output of the divider. This resultant voltage signal corresponds to the resistance of the wire at the downstream end of the heating zone between the probes 28.

The wire, after passing around the roll 18, then proceeds through the extrusion head 38 of the extruder to become coated with polymeric insulation 14.

In use of the apparatus, the wire 10, which is 19 AWG, is passed around the two rolls 16 and 18 on the way to the extruder 12. It is intended that the temperature of the wire as it proceeds into the extruder should be substantially the same as the temperature of the extrudate. Hence, the position of the two probes should be as close as possible to the extruder and this requires the extruder to be placed as close as possible to the downstream side of the roll 18. A current for heating the wire between the rolls 16 and 18 is passed into the roll 16 and out through roll 18. The current is sufficient to produce a potential difference of about 25 volts in the wire in its heating zone with an AC current of 400 amps.

As the wire proceeds along its path, the current transformer 22 continuously measures the current passing along the wire and a signal, which is an AC voltage signal, determined by the resistance 24, is fed into the converter 26.

It is known that as the wire is being heated, then its voltage varies according to the temperature. Hence, for the purpose of measuring the resistance of the wire, it is essential for the voltage to be measured at the downstream end portion of the heated wire, i.e. adjacent to the position of roll 18. The probes 28 continuously measure the voltage along the wire at this position. It is normally expected that the voltage between the probes should be of the order of about 0.5 volts such as is produced by passing a current of 400 amps down the conductor wire and with the heated wire temperature about 459° F. The measured voltage is passed to the converter 30. The signals received from the converters 26 and 30 in DC form, and representing voltage, are then combined in the divider 36 to give a resultant voltage signal as referred to above. This resultant voltage signal corresponds to the resistance of the heated wire between the probes 28. The resistance of the wire varies linearly as the temperature varies. Hence, the resistance may be used to determine the temperature of the conductor wire as it moves through the downstream end portion of the heating zone. Also, it follows that the resultant voltage also corresponds to the temperature of the heated wire at this position. It follows, therefore, that upon obtaining the resultant voltage signal, this signal may be shown visually upon a panel meter 40 or, alternatively, the meter may indicate the resistance or the temperature of the wire between the probes 28. Whether or not the temperature is shown directly by the meter, the temperature can in fact be determined by the panel display. Upon the temperature being determined and found to be in variance from that desired, the operator may then adjust the voltage applied along the heating zone in the appropriate fashion to change the temperature at the output end to that which is desired.

It is found with the use of the above apparatus, that the temperature of the heated wire is easily determined. The fact that the probes 28 are not disposed immediately at the downstream end of the heating zone is negligible for the purpose of measuring the temperature. As an alternative, probes could be applied to the roll itself to measure the resistance but this is more difficult to achieve in a practical sense.

The above apparatus for measuring temperature thus operates according to Ohm's Law in that the current and voltage are first determined, thereby enabling determination of the resistance of the heated wire and thus its temperature. The fact that dust may be in the surrounding atmosphere, upon parts of the apparatus or upon the conductor wire itself, does not affect the readings because the readings are concerned solely with the electrical values which are found travelling along the wire. Hence the apparatus is completely reliable and does not tend to operate inefficiently in the presence of other electrically conductive matter such as copper dust.

It has been shown that when copper wire has been heated by the above apparatus, and its temperature measured also by the above apparatus to enable the temperature to be accurately controlled, then after the polymer insulation has been applied, the cooling of the insulation has followed in a uniform manner to result in a uniformly insulated wire in which the properties of the insulation have been maintained substantially constant. Of particular importance in this regard is that a plurality of apparatus according to the embodiment, may be installed upon various lines in a factory with the full knowledge that all of the lines will produce lengths of insulated conductor all having substantially the same electrical properties, because heated temperatures of all the conductors are substantially equal before reaching the extruder. Thus insulated conductor wires made upon different pieces of apparatus according to the first embodiment may be combined together without detracting from the electrical performance of the finished cable.

What is claimed is:

1. A method of monitoring the temperature of electrically conductive wire during heating of the wire comprising:
    feeding the wire through a heating zone and heating it in said zone by passing an electric current through the wire between first and second points defining said zone;
    measuring the current along the wire in said zone;
    measuring the voltage along the wire only between third and fourth points at a downstream end portion of said zone, the distance between said third and fourth points being less than the distance between said first and second points; and
    combining signals corresponding to the measured voltage and current to produce a resultant signal corresponding to the value of the resistance of the wire at said downstream end portion, this value corresponding to the temperature of the heated wire.

2. A method of providing an insulated conductor wire comprising:
    feeding the wire through a heating zone and heating it in said zone by passing an electric current through the wire between first and second points defining said zone;
    measuring the current along the wire in said zone;
    measuring the voltage along the wire only between third and fourth points at a downstream end portion of said zone, the distance between said third and fourth points being less than the distance between said first and second points;
    combining signals corresponding to the measured voltage and current to produce a resultant signal corresponding to the value of the resistance of the wire at said downstream end portion, this value also corresponding to the temperature of the heated wire and thus enabling the current passing through the wire to be controlled to control the wire temperature within preset limits; and
    passing the heated wire through an extruder to extrude a polymeric insulation around the wire.

3. A method according to claim 2, wherein the wire is passed over two rolls positioned at the two ends of the heating zone and closes an electrical circuit between the two rolls, the current passing through one roll, along the wire and to the other roll to heat the wire.

4. A method according to claim 2, wherein the current in the wire creates a current in a current transformer, the transformer current is converted to a first voltage signal corresponding to the current in the transformer, the voltage in the downstream end of the wire is measured as a second voltage signal, the first voltage signal is converted to a first voltage signal of DC form which is equivalent to the heating value of the current in the transformer, the second voltage signal is converted to a second voltage signal of DC form, and the voltage signals of DC form are divided one by the other to produce the resultant signal which corresponds to the value of the resistance of the wire at its downstream end portion.

5. Apparatus for monitoring temperature of electrically conductive wire during heating of the wire comprising:
    means to pass a heating current along the wire between first and second points defining a heating zone as the wire is passed along a feedpath and through the zone;
    current measuring means disposed to measure the current along the wire in said zone;
    voltage measuring means disposed to contact the wire at third and fourth points at a downstream end portion of said zone as said wire passes through said downstream end portion of the zone to measure the voltage along the wire at said downstream end portion;
    means to produce combinable voltage signals which correspond to the measured current and voltage; and
    combining means for said voltage signals to produce a resultant signal representative of the value of the resistance in the wire at said downstream end portion of the wire.

6. Apparatus for providing an insulated conductor wire comprising:
    means to pass a heating current along the wire between first and second points defining a heating zone as the wire is passed along a feedpath and through the zone;

current measuring means disposed to measure the current in the wire along said zone;

a voltage measuring means disposed to contact the wire at third and fourth points disposed at a downstream end portion of said zone as said wire passes through said downstream end portion of the zone to measure the voltage along the wire at said downstream end portion, the distance between said third and fourth points being less than the distance between aid first and second points;

means to produce combinable voltage signals which correspond to the measured current and voltage;

combining means for said voltage signals to produce a resultant signal representative of the value of the resistance in the wire at said downstream end portion of the wire; and immediately downnstream of the voltage measuring means, an extruder for insulation, the feedpath for the wire extending through an extrusion head of the extruder to enable a layer of polymeric insulation to be extruded around the wire as it passes through the head.

* * * * *